(12) United States Patent
Jing et al.

(10) Patent No.: US 9,344,164 B2
(45) Date of Patent: May 17, 2016

(54) METHOD, SYSTEM AND DEVICE FOR FEEDING BACK AND RECEIVING PMI

(71) Applicant: China Academy of Telecommunications Technology, Beijing (CN)

(72) Inventors: Meifang Jing, Beijing (CN); Xin Su, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/424,035

(22) PCT Filed: Aug. 27, 2013

(86) PCT No.: PCT/CN2013/082358
§ 371 (c)(1),
(2) Date: Feb. 26, 2015

(87) PCT Pub. No.: WO2014/032566
PCT Pub. Date: Mar. 6, 2014

(65) Prior Publication Data
US 2015/0222335 A1 Aug. 6, 2015

(30) Foreign Application Priority Data

Aug. 27, 2012 (CN) .......................... 2012 1 0308581

(51) Int. Cl.
*H04L 1/02* (2006.01)
*H04L 27/28* (2006.01)
*H04B 7/04* (2006.01)
*H04B 7/06* (2006.01)

(52) U.S. Cl.
CPC ............ *H04B 7/0417* (2013.01); *H04B 7/0456* (2013.01); *H04B 7/0469* (2013.01); *H04B 7/0478* (2013.01); *H04B 7/065* (2013.01); *H04B 7/0652* (2013.01)

(58) Field of Classification Search
CPC ..... H04B 7/0417; H04B 7/0456; H04B 7/065

USPC .......... 375/267, 347; 370/252, 328, 329, 330; 455/101, 561, 562
See application file for complete search history.

(56) References Cited

U.S. PATENT DOCUMENTS

2013/0064128 A1* 3/2013 Li .......................... H04B 7/065
                                                              370/252
2013/0308715 A1* 11/2013 Nam .................... H04B 7/0469
                                                              375/267
2014/0301492 A1* 10/2014 Xin ...................... H04B 7/0456
                                                              375/267

FOREIGN PATENT DOCUMENTS

| CN | 101867447 A | 10/2010 |
| CN | 102412885 A | 4/2012 |
| CN | 102638337 A | 8/2012 |

OTHER PUBLICATIONS

International Search Report for PCT/CN2013/082358.

*Primary Examiner* — Khai Tran
(74) *Attorney, Agent, or Firm* — Kilpatrick Townsend & Stockton LLP

(57) ABSTRACT

The embodiments of the disclosure relate to the technical field of wireless communications, and particularly relate to a method, a system and a device for feeding back and receiving a Pre-coding Matrix Indicator (PMI), which is used for feeding back a vertical dimension PMI. The method for feeding back the PMI provided by the embodiments of the disclosure comprises: confirming the PMI needed to be fed back, wherein the PMI comprises a horizontal dimension PMI and a vertical dimension PMI, or a PMI combined by horizontal dimension and vertical dimension (801); feeding back the confirmed PMI in a non periodic Channel State Information (CSI) feedback mode or a periodic CSI feedback mode (802). Since the capability of feeding back the vertical dimension PMI, dynamic 3D beam shaping technology can be implemented and the throughput of the user equipments in the edge of cell and the average throughput can be improved.

8 Claims, 3 Drawing Sheets

METHOD, SYSTEM AND DEVICE FOR FEEDING BACK AND RECEIVING PMI

The present application is a US National Stage of International Application No. PCT/CN2013/082358, filed Aug. 27, 2013, designating the United States, and claiming the benefit of Chinese Patent Application No. 201210308581.6, filed with the Chinese Patent Office on Aug. 27, 2012 and entitled "Method, system and device for feeding back and receiving PMI", which are hereby incorporated by reference in their entireties.

FIELD

The present disclosure relates to the field of wireless communications and particularly to a method, system and device for feeding back and receiving a PMI.

BACKGROUND

In the prior art, peak data rates of a cell have been significantly improved, but rates at the edge of the cell remain far below the peak rates, and in view of this, extensive investigation has been made on improving the throughput of a User Equipment (UE), and the average throughput, at the edge of the cell, where dynamical three-dimension (3D) beam-forming is a key technology to improve the average throughput at the edge of the cell.

Corresponding channel state information needs to be fed back in order to support transmission of dynamical 3D beam-forming. For example, a Channel Quality Indicator (CQI) is configured for UE scheduling, a Modulation and Coding Scheme (MCS) and/or Multiple-User Multiple Input Multiple Output (MIMO) pairing, etc., a Pre-coding Matrix Indicator (PMI) is configured for determining beam-forming, multiple-user scheduling, MU-MIMO pairing, etc., and Rank Indication (RI) information can be configured for determining the number of layers used for data transmission, etc.

In the existing Long Term Evolution/Long Term Evolution-Advanced (LTE/LTE-A) system, there are supported five types of non-periodical channel state information feedback, i.e., Physical Uplink Shared Channel (PUSCH) feedback modes, and four types of periodical channel state information feedbacks, i.e., Physical Uplink Control Channel (PUCCH) feedback modes, respectively as depicted in Table 1 and Table 2, where the mode 1-2 in Table 1 is configured to feed back an RI, a sub-band PMI and a broadband CQI, the mode 2-2 is configured to feed back an RI, a broadband CQI/PMI, and a UE selected sub-band CQI/PMI, the mode 2-0 supports a feedback of an RI, a broadband CQI, and a UE selected sub-band CQI, the mode 3-0 is configured to report an RI, a broadband CQI, and a sub-band CQI, and the mode 3-1 is configured to report an RI, a broadband CQI/PMI, and a sub-band CQI; and the mode 1-0 in Table 2 is configured to feed back a broadband CQI, the mode 1-1 includes two sub-modes supporting a feedback of an RI, a broadband PMI and a CQI, the mode 2-0 is configured to feed back a UE selected sub-band CQI, and a broadband CQI, and the mode 2-1 is configured to feed back RI, broadband PMI/CQI and sub-band CQI (or sub-band PMI) information.

TABLE 1

CQI and PMI feedback types of PUSCH report modes

| | | PMI feedback type | | |
|---|---|---|---|---|
| | | No PMI | Single PMI | Multi-PMI |
| PUSCH CQI feedback type | Broadband (broadband CQI) | | | Mode 1-2 |
| | UE selected (sub-band CQI) | Mode 2-0 | | Mode 2-2 |
| | Higher-layer configured (sub-band CQI) | Mode 3-0 | Mode 3-1 | |

TABLE 2

CQI and PMI feedback types of PUCCH report modes

| | | PMI feedback type | |
|---|---|---|---|
| | | No PMI | Single PMI |
| PUCCH CQI Feedback type | Broadband (broadband CQI) | Mode 1-0 | Mode 1-1 |
| | UE selected (sub-band CQI) | Mode 2-0 | Mode 2-1 |

Dynamical 3D beam-forming involves both horizontal and vertical beam-forming to thereby improve the signal to noise ratio of a target UE. A transmitter has to know a pre-coding matrix of the target UE in the horizontal and vertical dimension to thereby perform beam-forming on the UE, that is, the target UE has to feed back horizontal and vertical PMIs, but an existing feedback solution supports only a feedback of the horizontal PMIs but no 3D beam-forming.

In summary, the vertical PMIs can not be fed back in the prior art so that dynamical 3D beam-forming may be impossible.

SUMMARY

Embodiments of the disclosure provide a method, system and device for feeding back and receiving a PMI so as to feed back and receive PMIs in the vertical dimension.

An embodiment of the disclosure provides a method for feeding back a Pre-coding Matrix Indicator (PMI), the method including:

determining PMIs to be fed back including horizontal PMIs and vertical PMIs, or horizontal and vertical joint PMIs; and feeding back the determined PMIs in a non-periodical CSI feedback mode or a periodical CSI feedback mode.

An embodiment of the disclosure provides a method for receiving a Pre-coding Matrix Indicator (PMI), the method including:

determining a feedback mode in which PMIs are fed back, wherein the feedback mode is a non-periodical CSI feedback mode or a periodical CSI feedback mode; and receiving the fed-back PMIs in the determined feedback mode, wherein the PMIs include horizontal PMIs and vertical PMIs, or horizontal and vertical joint PMIs.

An embodiment of the disclosure provides a device for feeding back a Pre-coding Matrix Indicator (PMI), the device including:

a first determining module configured to determine PMIs to be fed back including horizontal PMIs and vertical PMIs, or horizontal and vertical joint PMIs; and a transmitting module configured to feed back the determined PMIs in a non-periodical CSI feedback mode or a periodical CSI feedback mode.

An embodiment of the disclosure provides a device for receiving a Pre-coding Matrix Indicator (PMI), the device including:

a second determining module configured to determine a feedback mode in which PMIs are fed back, wherein the feedback mode is a non-periodical CSI feedback mode or a periodical CSI feedback mode; and a receiving module configured to receive the fed-back PMIs in the determined feedback mode, wherein the PMIs include horizontal PMIs and vertical PMIs, or horizontal and vertical joint PMIs.

An embodiment of the disclosure provides a system for feeding back a Pre-coding Matrix Indicator (PMI), the system including:

a transmitting device configured to determine PMIs to be fed back including horizontal PMIs and vertical PMIs or horizontal and vertical joint PMIs; and to feed back the determined PMIs in a non-periodical CSI feedback mode or a periodical CSI feedback mode; and a receiving device configured to determine the feedback mode in which the PMIs are fed back, which is a non-periodical CSI feedback mode or a periodical CSI feedback mode, and to receive the fed-back PMIs in the determined feedback mode, the PMI including horizontal PMIs and vertical PMIs, or horizontal and vertical joint PMIs.

Since the vertical PMIs can be fed back, dynamical 3D beam-forming can be performed to improve the throughput of a UE, and the average throughput, at the edge of a cell.

DETAILED DESCRIPTION

In the embodiments of the disclosure, PMIs including horizontal PMIs and vertical PMIs or horizontal and vertical joint PMIs are fed back in a non-periodical Channel State Information (CSI) feedback mode or a periodical CSI feedback mode. Since the vertical PMIs can be fed back, dynamical 3D beam-forming can be performed to improve the throughput of a UE, and the average throughput, at the edge of a cell.

The embodiments of the disclosure will be described below in further details with reference to the drawings.

Figure 1:
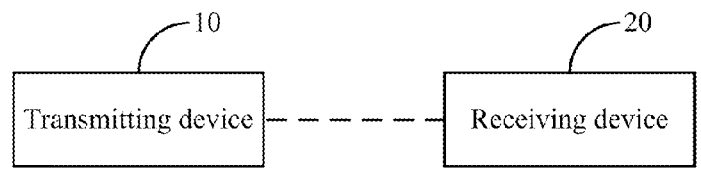
FIG. 1 illustrates a schematic structural diagram of a system for feeding back a PMI according to an embodiment of the disclosure.

As illustrated in FIG. 1, a system for feeding back a PMI according to an embodiment of the disclosure includes a transmitting device 10 and a receiving device 20.

The transmitting device 10 is configured to determine PMIs to be fed back including horizontal PMIs and vertical PMIs, or horizontal and vertical joint PMIs; and to feed back the determined PMIs in a non-periodical CSI feedback mode or a periodical CSI feedback mode; and The receiving device 20 is configured to determine the feedback mode in which the PMIs are fed back, which is a non-periodical CSI feedback mode or a periodical CSI feedback mode, and to receive the fed-back PMIs in the determined feedback mode.

Preferably the transmitting device 10 estimates channel information from configured pilot information and then determines the PMIs from the estimated channel information using some criterion, e.g., the highest capacity, the largest transport data block, the highest correlation, etc., for example, the transmitting device obtains channels, and equivalent channels of respective available PMIs, using the highest capacity criterion and then calculates a capacity corresponding to each equivalent channel and determines the PMIs corresponding to the highest capacities as the PMIs to be determined.

Particularly the channel information includes horizontal and vertical channel information, which can be estimated separately or can be estimated jointly.

The transmitting device 10 can determine the PMIs to be fed back by selecting at least one horizontal PMI and at least one vertical PMI from different sets of codebooks or the same set of codebooks; or by selecting at least one horizontal and vertical joint PMI from a joint set of codebooks.

The sets of codes include sets of horizontal codebooks and sets of vertical codebooks.

If at least one horizontal PMI and at least one vertical PMI are selected from different sets of codebooks, then the different sets of codebooks are sets of codebooks determined respectively for horizontal and vertical channel characteristics; and If at least one horizontal PMI and at least one vertical PMI are selected from the same set of codebooks, then the same set of codebooks is a set of codebooks determined for horizontal and vertical channel characteristics; and Particularly the sets of horizontal codebooks include a part or all of sets of 2-antenna codebooks, sets of 4-antenna codebooks and sets of 8-antenna codebooks in the Rel-10; and the sets of vertical codebooks include a part or all of the sets of 2-antenna codebooks, the sets of 4-antenna codebooks and the sets of 8-antenna codebooks in the Rel-10. For example, there are only 2-atenna, 4-antenna and 8-antenna rank-1 codebooks.

Particularly, reference can be made to the 3GPP TS 36.211 protocol for details of the sets of 2-antenna codebooks, the sets of 4-antenna codebooks and the sets of 8-antenna codebooks in the Rel-10 in the Rel-10, so a repeated description thereof will be omitted here.

If at least one joint horizontal and vertical PMI is selected from a joint set of codebooks, then the set of codebooks is a set of codebooks determined for a horizontal and vertical joint channel characteristic, and the number of dimensions of a pre-coding matrix in the set of codebooks are (Nt*Ne)*R, where Nt represents the number of horizontal antenna ports, Ne represents the number of vertical antenna ports, and R represents the index of a rank.

Particularly a feedback granularity, at which the determined horizontal PMIs and vertical PMIs are fed back, is determined from the feedback mode or as a constant granularity.

In an implementation, if the PMIs include horizontal PMIs and vertical PMIs, then the horizontal PMIs and the vertical PMIs are fed back in the same sub-frame in the non-periodical CSI feedback mode, and the horizontal PMIs and the vertical PMIs may be fed back in the same sub-frame or in different sub-frames in the periodical CSI feedback mode.

In the periodical CSI feedback mode, the horizontal PMIs and the vertical PMIs are fed back only in the same sub-frame; or the horizontal PMIs and the vertical PMIs are fed back in the same sub-frame or different sub-frames; or the horizontal PMIs and the vertical PMIs are fed back only in different sub-frames, which will be described respectively below.

In a first implementation, the horizontal PMIs and the vertical PMIs are fed back only in the same sub-frame in the periodical CSI feedback mode.

The horizontal PMIs and the vertical PMIs are fed back in the same sub-frame together with corresponding CQIs or, of course, may be fed back in the same sub-frame without the CQIs.

When the horizontal PMIs and the vertical PMIs are fed back in different sub-frames, the horizontal PMIs are fed back at the same or different periodicity as or from a periodicity at which the vertical PMIs are fed back.

Particularly the horizontal PMIs and the vertical PMIs, and corresponding CQIs are fed back in respective sub-frames, and report periodicities and offsets of the sub-frames may be the same as the broadband CQI/PMI report type defined in the 3GPP TS 36.211, e.g., the type 2, the type 2b and the type 2c, or may be signaled separately in higher-layer signaling.

In a second implementation, the horizontal PMIs and the vertical PMIs are fed back in the same sub-frame or different sub-frames in the periodical CSI feedback mode.

If the horizontal PMIs and the vertical PMIs are fed back in the same sub-frame, then there is also corresponding CQI information in the sub-frame in which the horizontal PMIs and the vertical PMIs are fed back or, of course, there may be only the PMI in the sub-frame;

If the horizontal PMIs and the vertical PMIs are fed back indifferent sub-frames, then there is also corresponding CQI information in the sub-frame in which the horizontal PMIs are fed back and/or there is also corresponding CQI information in the sub-frame in which the vertical PMIs are fed back or, of course, there may be only the PMI in the sub-frame;

Particularly CQIs corresponding to the horizontal PMIs are determined from the horizontal PMIs or the horizontal PMIs and the vertical PMIs, that is, the CQIs corresponding to the horizontal PMIs may include only 2D channel CQIs derived from the horizontal PMIs or may include 3D channel CQIs derived jointly from the horizontal PMIs and the vertical PMIs; and Particularly CQIs corresponding to the vertical PMIs are determined from the vertical PMIs or the horizontal PMIs and the vertical PMIs, that is, the CQIs corresponding to the horizontal PMIs may include only 2D channel CQIs derived from the vertical PMIs or may include 3D channel CQIs derived jointly from the horizontal PMIs and the vertical PMIs.

When the horizontal PMIs and the vertical PMIs are fed back in different sub-frames, the horizontal PMIs are fed back at the same or different periodicity as or from a periodicity at which the vertical PMIs are fed back.

Particularly when the horizontal PMIs and the vertical PMIs are fed back in the same sub-frame, they are fed back as in the first implementation; and When the horizontal PMIs and the vertical PMIs are fed back separately, the horizontal PMIs or the vertical PMIs and the corresponding CQIs are reported, or only the horizontal PMIs or the vertical PMIs are reported, and they may or may not be fed back at the same periodicity as a periodicity at which the horizontal PMIs and the vertical PMIs are fed back together, and their report periodicities and offsets may be the same as the broadband CQI/PMI report type defined in the 3GPP TS 36.211, e.g., the type 2a, or may be signaled separately in higher-layer signaling.

In a third implementation, the horizontal PMIs and the vertical PMIs are fed back only in different sub-frames in the periodical CSI feedback mode.

There is also corresponding CQI information in the sub-frame in which the horizontal PMIs are fed back and/or there is also corresponding CQI information in the sub-frame in which the vertical PMIs are fed back or, of course, there may be only the PMI in the sub-frame.

Particularly CQIs corresponding to the horizontal PMIs are determined from the horizontal PMIs or the horizontal PMIs and the vertical PMIs, that is, the CQIs corresponding to the horizontal PMIs may include only 2D channel CQIs derived from the horizontal PMIs or may include 3D channel CQIs derived jointly from the horizontal PMIs and the vertical PMIs; and Particularly CQIs corresponding to the vertical PMIs are determined from the vertical PMIs or the horizontal PMIs and the vertical PMIs, that is, the CQIs corresponding to the horizontal PMIs may include only 2D channel CQIs derived from the vertical PMIs or may include 3D channel CQIs derived jointly from the horizontal PMIs and the vertical PMIs.

When the horizontal PMIs and the vertical PMIs are fed back in different sub-frames, the horizontal PMIs are fed back at the same or different periodicity as or from a periodicity at which the vertical PMIs are fed back.

Particularly the horizontal PMIs and the vertical PMIs may be fed back in different sub-frames at the same or different periodicities, where a report type in which the horizontal PMIs are fed back may be the PMIs and the CQIs or only the PMIs, and a report type in which the vertical PMIs are fed back may be the PMIs and the CQIs or only the PMIs.

In an implementation, if the sub-frame in which the PMIs are fed back collides with a sub-frame in which RIs are fed back, then only RI information is fed back;

If the sub-frame in which the vertical PMIs are fed back collide with the sub-frame in which the horizontal PMIs are fed back, then only the horizontal PMIs are fed back; and If the sub-frame in which the horizontal PMIs and the vertical PMIs are fed back collides with the sub-frame in which the horizontal PMIs or the vertical PMIs are fed back, then only the horizontal PMIs and the vertical PMIs are fed back.

The receiving device 20 receives all the horizontal PMIs and the vertical PMIs at one time if the horizontal PMIs and the vertical PMIs are received in the non-periodical CSI feedback mode; and receives all the horizontal PMIs and the vertical PMIs at more than one time if the horizontal PMIs and the vertical PMIs are received in the periodical CSI feedback mode.

In an implementation, the receiving device 20 determines a pre-coding matrix from obtained PMI information and pre-codes data and a demodulation pilot and then transmits a pre-coded signal.

Particularly the receiving device 20 determines horizontal and vertical pre-coding matrixes or a horizontal and vertical joint pre-coding matrix from corresponding codebooks according to the PMI information, where the codebooks used by the receiving device 20 are the same as the codebooks used by the transmitting device 10 to select the PMIs.

Particularly the transmitting device 10 according to the embodiment of the disclosure may be a UE, a relay device, etc.; and the receiving device 20 may be an eNB, a low-power transmitting node, etc.

Figure 2:
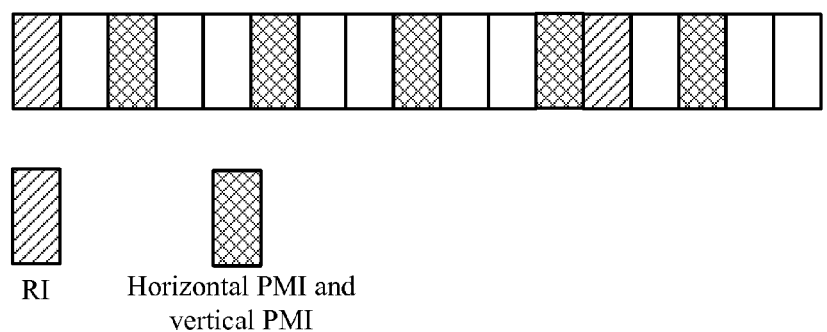
FIG. 2 illustrates a schematic diagram of a first feedback according to an embodiment of the disclosure.

Several particular examples will be listed below:

In a first example, horizontal PMIs and vertical PMIs are fed back in the same sub-frame with a feedback periodicity and a sub-frame offset configured the same as the existing broadband CQI/PMI report type including the type 2, the type 2b and the type 2c, and there is also corresponding CQI information, calculated from the horizontal PMIs and the vertical PMIs, in the sub-frame in which the horizontal PMIs and the vertical PMIs are fed back. Reference can be made to FIG. 2 for details thereof.

Figure 3:
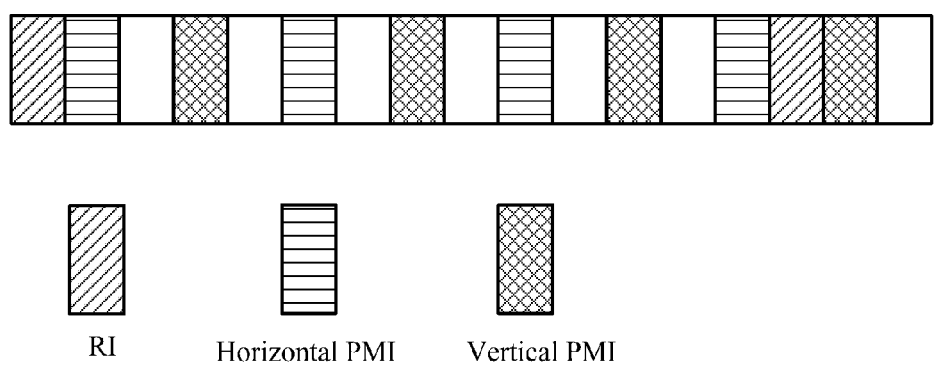
FIG. 3 illustrates a schematic diagram of a second feedback according to an embodiment of the disclosure.
Figure 4:
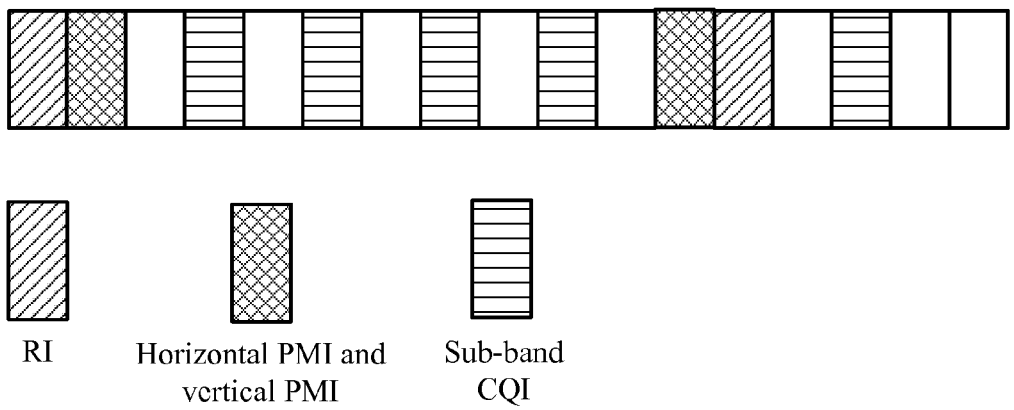
FIG. 4 illustrates a schematic diagram of a third feedback according to an embodiment of the disclosure.

In a second example, horizontal PMIs and vertical PMIs are fed back in different sub-frames with feedback periodicities and sub-frame offsets respectively signaled in two types of signaling, where there is also CQI information, calculated from the horizontal PMIs, in the sub-frame in which the horizontal PMIs are fed back, and there is also CQI information, calculated from previously reported horizontal PMIs and the current vertical PMIs possibly as absolute values or as differences from horizontal CQIs, in the sub-frame in which the vertical PMIs are fed back. Reference can be made to FIG. 3 for details thereof.

In a third example, horizontal PMIs and vertical PMIs are fed back in the same sub-frame with a feedback periodicity and a sub-frame offset, signalized in higher-layer signaling, both of which can be configured the same as the existing broadband CQI/PMI report type including the type 2, the type 2b and the type 2c, where there is also CQI information, calculated from the horizontal PMIs and the vertical PMIs, in the sub-frame in which the horizontal PMIs and the vertical PMIs are fed back, and there may be also PMI information, including horizontal PMIs and vertical PMIs, of sub-bands in a sub-frame in which sub-band CQIs calculated from previously fed-back horizontal PMIs and vertical PMIs and/or the current sub-band PMIs are fed back. Reference can be made to FIG. 3 for details thereof.

Figure 5:
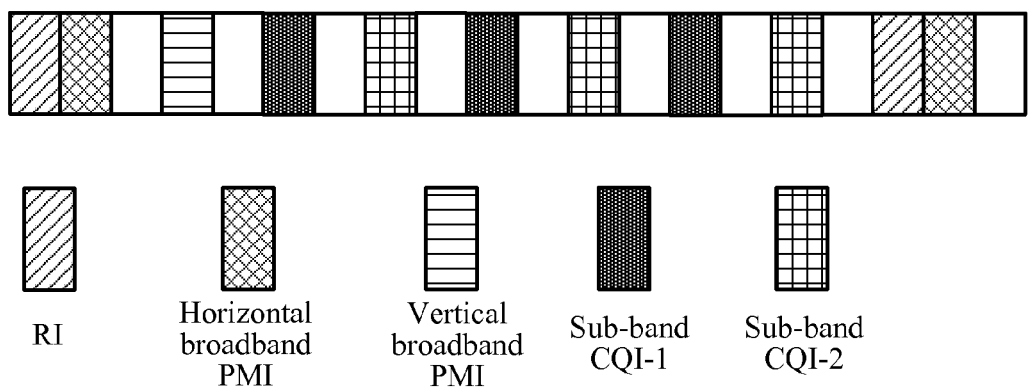
FIG. 5 illustrates a schematic diagram of a fourth feedback according to an embodiment of the disclosure.

In a fourth example, horizontal PMIs and vertical PMIs are fed back in different sub-frames with feedback periodicities and sub-frame offsets configured as signaled in higher-layer signaling, where there is also CQI information, calculated from the horizontal PMIs, in the sub-frame in which the horizontal PMIs are fed back, and there is also CQI information, calculated from previously reported horizontal PMIs and the current vertical PMIs possibly as absolute values or as differences from horizontal CQIs, in the sub-frame in which the vertical PMIs are fed back. There may be also PMI information, including horizontal PMIs, of sub-bands in a sub-frame in which sub-band CQI-1's calculated from previously fed-back horizontal PMIs and/or the current sub-band PMIs are fed back. There may be also PMI information, including vertical PMIs, of sub-bands in a sub-frame in which sub-band CQI-2's calculated from previously fed-back horizontal PMIs, vertical PMIs and horizontal sub-band PMIs and/or the current sub-band PMIs are fed back. Reference can be made to FIG. 5 for details thereof.

Figure 6:
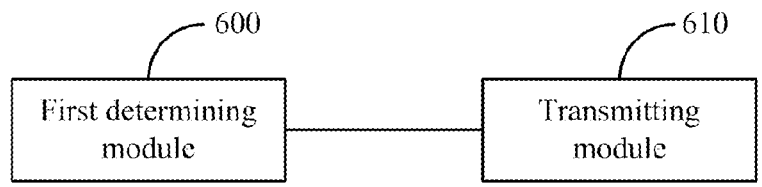
FIG. 6 illustrates a schematic structural diagram of a transmitting device in the system for feeding back a PMI according to an embodiment of the disclosure.

As illustrated in FIG. 6, a transmitting device in the system for feeding back a PMI according to an embodiment of the disclosure includes a first determining module 600 and a transmitting module 610.

The first determining module 600 is configured to determine PMIs to be fed back including horizontal PMIs and vertical PMIs or horizontal and vertical joint PMIs; and The transmitting module 610 is configured to feed back the determined PMIs in a non-periodical CSI feedback mode or a periodical CSI feedback mode.

Preferably the first determining module 600 selects at least one horizontal PMI and at least one vertical PMI from different sets of codebooks or the same set of codebooks; or selects at least one horizontal and vertical joint PMI from a joint set of codebooks.

Preferably the PMIs include horizontal PMIs and vertical PMIs; and

In the periodical CSI feedback mode,

The horizontal PMIs and the vertical PMIs are fed back only in the same sub-frame;

The horizontal PMIs and the vertical PMIs are fed back in the same sub-frame or different sub-frames; or The horizontal PMIs and the vertical PMIs are fed back only in different sub-frames.

Preferably if the horizontal PMIs and the vertical PMIs are fed back only in the same sub-frame in the periodical CSI feedback mode, then the horizontal PMIs and the vertical PMIs are fed back in the same sub-frame together with corresponding CQIs.

Preferably the horizontal PMIs and the vertical PMIs are fed back in the same sub-frame or different sub-frames in the periodical CSI feedback mode; and If the horizontal PMIs and the vertical PMIs are fed back in the same sub-frame, then there is also corresponding CQI information in the sub-frame in which the horizontal PMIs and the vertical PMIs are fed back, and If the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Figure 7:
FIG. 7 illustrates a schematic structural diagram of a receiving device in the system for feeding back a PMI according to an embodiment of the disclosure.

As illustrated in FIG. 7, a receiving device in the system for feeding back a PMI according to an embodiment of the disclosure includes a second determining module 700 and a receiving module 710.

The second determining module 700 is configured to determine a feedback mode in which PMIs are fed back, where the feedback mode is a non-periodical CSI feedback mode or a periodical CSI feedback mode; and The receiving module 710 is configured to receive the fed-back PMIs in the determined feedback mode, where the PMIs include horizontal PMIs and vertical PMIs or horizontal and vertical joint PMIs.

Preferably the PMIs include horizontal PMIs and vertical PMIs; and

In the periodical CSI feedback mode,

The horizontal PMIs and the vertical PMIs are fed back only in the same sub-frame;

The horizontal PMIs and the vertical PMIs are fed back in the same sub-frame or different sub-frames; or The horizontal PMIs and the vertical PMIs are fed back only in different sub-frames.

Preferably if the horizontal PMIs and the vertical PMIs are fed back only in the same sub-frame in the periodical CSI feedback mode, then the horizontal PMIs and the vertical PMIs are fed back in the same sub-frame together with corresponding CQIs.

Preferably the horizontal PMIs and the vertical PMIs are fed back in the same sub-frame or different sub-frames in the periodical CSI feedback mode; and If the horizontal PMIs and the vertical PMIs are fed back in the same sub-frame, then there is also corresponding CQI information in the sub-frame in which the horizontal PMIs and the vertical PMIs are fed back, and If the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Based upon the same inventive idea, an embodiment of the disclosure further provides a method for feeding back a PMI, and since the method addresses the problem under a similar principle to the transmitting device in the system for feeding back a PMI according to the embodiment of the disclosure in FIG. 1, reference can be made to the implementation of the transmitting device for an implementation of the method, so a repeated description thereof will be omitted here.

Figure 8:
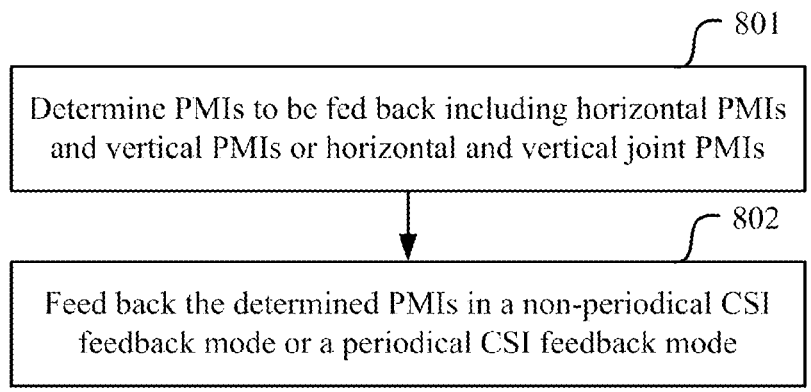
FIG. 8 illustrates a schematic flow chart of a method for feeding back a PMI according to an embodiment of the disclosure.

As illustrated in FIG. 8, a method for feeding back a PMI according to an embodiment of the disclosure includes the following operations:

The operation 801 is to determine PMIs to be fed back including horizontal PMIs and vertical PMIs or horizontal and vertical joint PMIs; and The operation 802 is to feed back the determined PMIs in a non-periodical CSI feedback mode or a periodical CSI feedback mode.

Preferably the operation 801 is performed by selecting at least one horizontal PMI and at least one vertical PMI from different sets of codebooks or the same set of codebooks; or by selecting at least one horizontal and vertical joint PMI from a joint set of codebooks.

Preferably the sets of codes include sets of horizontal codebooks and sets of vertical codebooks, Where the sets of horizontal codebooks include a part or all of sets of 2-antenna codebooks, sets of 4-antenna codebooks and sets of 8-antenna codebooks in the Rel-10; and The sets of vertical codebooks include a part or all of the sets of 2-antenna codebooks, the sets of 4-antenna codebooks and the sets of 8-antenna codebooks in the Rel-10.

Preferably the number of dimensions of a pre-coding matrix in the set of codebooks from which at least one joint PMI is selected are (Nt*Ne)*R, Where Nt represents the number of horizontal antenna ports, Ne represents the number of vertical antenna ports, and R represents the index of a rank.

Preferably a feedback granularity, at which the determined horizontal PMIs and vertical PMIs are fed back, is determined from the feedback mode or as a constant granularity.

Preferably the PMIs include horizontal PMIs and vertical PMIs; and

In the periodical CSI feedback mode,

The horizontal PMIs and the vertical PMIs are fed back only in the same sub-frame;

The horizontal PMIs and the vertical PMIs are fed back in the same sub-frame or different sub-frames; or The horizontal PMIs and the vertical PMIs are fed back only in different sub-frames.

Preferably if the horizontal PMIs and the vertical PMIs are fed back only in the same sub-frame in the periodical CSI feedback mode, then the horizontal PMIs and the vertical PMIs are fed back in the same sub-frame together with corresponding CQIs.

Preferably the horizontal PMIs and the vertical PMIs are fed back in the same sub-frame or different sub-frames in the periodical CSI feedback mode; and If the horizontal PMIs and the vertical PMIs are fed back in the same sub-frame, then there is also corresponding CQI information in the sub-frame in which the horizontal PMIs and the vertical PMIs are fed back, and If the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably when the horizontal PMIs and the vertical PMIs are fed back in different sub-frames, the horizontal PMIs are fed back at the same or different periodicity as or from a periodicity at which the vertical PMIs are fed back.

Preferably if the sub-frame in which the PMIs are fed back collides with a sub-frame in which RIs are fed back, then only RI information is fed back;

If the sub-frame in which the vertical PMIs are fed back collide with the sub-frame in which the horizontal PMIs are fed back, then only the horizontal PMIs are fed back; and If the sub-frame in which the horizontal PMIs and the vertical PMIs are fed back collides with the sub-frame in which the horizontal PMIs or the vertical PMIs are fed back, then only the horizontal PMIs and the vertical PMIs are fed back.

Based upon the same inventive idea, an embodiment of the disclosure further provides a method for receiving a PMI, and since the method addresses the problem under a similar principle to the receiving device in the system for feeding back a PMI according to the embodiment of the disclosure in FIG. 1, reference can be made to the implementation of the receiving device for an implementation of the method, so a repeated description thereof will be omitted here.

Figure 9:
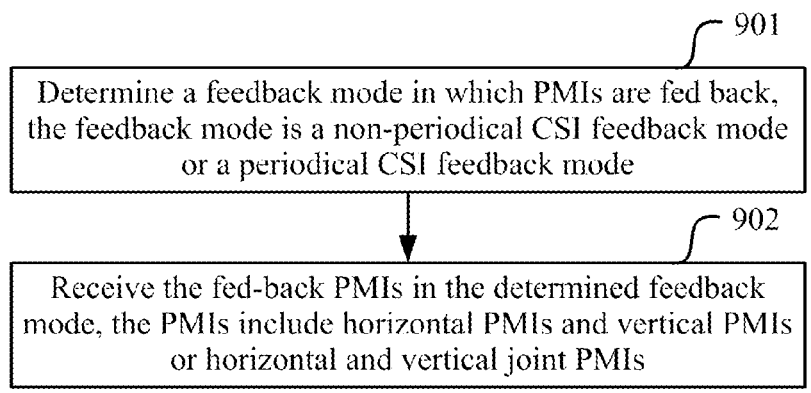
FIG. 9 illustrates a schematic flow chart of a method for receiving a PMI according to an embodiment of the disclosure.

As illustrated in FIG. 9, a method for receiving a PMI according to an embodiment of the disclosure includes the following operations:

The operation 901 is to determine a feedback mode in which PMIs are fed back, where the feedback mode is a non-periodical CSI feedback mode or a periodical CSI feedback mode; and The operation 902 is configured to receive the fed-back PMIs in the determined feedback mode, where the PMIs include horizontal PMIs and vertical PMIs or horizontal and vertical joint PMIs.

Preferably a feedback granularity is determined from the feedback mode or as a constant granularity.

Preferably the PMIs include horizontal PMIs and vertical PMIs; and

In the periodical CSI feedback mode,

The horizontal PMIs and the vertical PMIs are fed back only in the same sub-frame;

The horizontal PMIs and the vertical PMIs are fed back in the same sub-frame or different sub-frames; or The horizontal PMIs and the vertical PMIs are fed back only in different sub-frames.

Preferably if the horizontal PMIs and the vertical PMIs are fed back only in the same sub-frame in the periodical CSI feedback mode, then the horizontal PMIs and the vertical PMIs are fed back in the same sub-frame together with corresponding CQIs.

Preferably the horizontal PMIs and the vertical PMIs are fed back in the same sub-frame or different sub-frames in the periodical CSI feedback mode; and If the horizontal PMIs and the vertical PMIs are fed back in the same sub-frame, then there is also corresponding CQI information in the sub-frame in which the horizontal PMIs and the vertical PMIs are fed back, and If the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

The structure of and processing by the transmitting device according to the embodiment of the disclosure will be described below in connection with a preferred hardware structure.

For example, the transmitting device according to the embodiment of the disclosure is a UE including at least a transceiver and at least processor connected with the transceiver, where:

The processor is configured to determine PMIs to be fed back including horizontal PMIs and vertical PMIs or horizontal and vertical joint PMIs; and The transceiver is configured to feed back the determined PMIs in a non-periodical CSI feedback mode or a periodical CSI feedback mode.

Preferably the processor is configured to select at least one horizontal PMI and at least one vertical PMI from different sets of codebooks or the same set of codebooks; to select at least one horizontal and vertical joint PMI from a joint set of codebooks.

In the periodical CSI feedback mode,

The horizontal PMIs and the vertical PMIs are fed back only in the same sub-frame;

The horizontal PMIs and the vertical PMIs are fed back in the same sub-frame or different sub-frames; or The horizontal PMIs and the vertical PMIs are fed back only in different sub-frames.

Preferably if the horizontal PMIs and the vertical PMIs are fed back only in the same sub-frame in the periodical CSI feedback mode, then the horizontal PMIs and the vertical PMIs are fed back in the same sub-frame together with corresponding CQIs.

Preferably the horizontal PMIs and the vertical PMIs are fed back in the same sub-frame or different sub-frames in the periodical CSI feedback mode; and If the horizontal PMIs and the vertical PMIs are fed back in the same sub-frame, then there is also corresponding CQI information in the sub-frame in which the horizontal PMIs and the vertical PMIs are fed back, and If the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

The structure of and processing by the receiving device according to the embodiment of the disclosure will be described below in connection with a preferred hardware structure.

For example, the t receiving device according to the embodiment of the disclosure is an eNB including at least a transceiver and at least processor connected with the transceiver, where:

The processor is configured to determine a feedback mode in which PMIs are fed back, where the feedback mode is a non-periodical CSI feedback mode or a periodical CSI feedback mode; and The transceiver is configured to receive the fed-back PMIs in the determined feedback mode, where the PMIs include horizontal PMIs and vertical PMIs or horizontal and vertical joint PMIs.

Preferably the PMIs include horizontal PMIs and vertical PMIs; and

In the periodical CSI feedback mode,

The horizontal PMIs and the vertical PMIs are fed back only in the same sub-frame;

The horizontal PMIs and the vertical PMIs are fed back in the same sub-frame or different sub-frames; or The horizontal PMIs and the vertical PMIs are fed back only in different sub-frames.

Preferably if the horizontal PMIs and the vertical PMIs are fed back only in the same sub-frame in the periodical CSI feedback mode, then the horizontal PMIs and the vertical PMIs are fed back in the same sub-frame together with corresponding CQIs.

Preferably the horizontal PMIs and the vertical PMIs are fed back in the same sub-frame or different sub-frames in the periodical CSI feedback mode; and If the horizontal PMIs and the vertical PMIs are fed back in the same sub-frame, then there is also corresponding CQI information in the sub-frame in which the horizontal PMIs and the vertical PMIs are fed back, and If the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Preferably if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, Where CQIs corresponding to the horizontal PMIs are determined from the horizontal PMIs or the horizontal PMIs and the vertical PMIs; and CQIs corresponding to the vertical PMIs are determined from the vertical PMIs or the horizontal PMIs and the vertical PMIs.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for feeding back a Pre-coding Matrix Indicator, PMI, wherein the method comprises:
   determining PMIs to be fed back including horizontal PMIs and vertical PMIs, or horizontal and vertical joint PMIs; and
   feeding back the determined PMIs in a non-periodical Channel State Information, CSI, feedback mode or a periodical CSI feedback mode;

wherein in a case that the PMIs comprise horizontal PMIs and vertical PMIs; and in the periodical CSI feedback mode, the horizontal PMIs and the vertical PMIs are fed back only in the same sub-frame;

the horizontal PMIs and the vertical PMIs are fed back in the same sub-frame or different sub-frames; or the horizontal PMIs and the vertical PMIs are fed back only in different sub-frames;

wherein if the horizontal PMIs and the vertical PMIs are fed back only in the same sub-frame in the periodical CSI feedback mode, then the horizontal PMIs and the vertical PMIs are fed back in the same sub-frame together with corresponding Channel Quality Indicators, CQIs;

wherein the horizontal PMIs and the vertical PMIs are fed back in the same sub-frame or different sub-frames in the periodical CSI feedback mode; and if the horizontal PMIs and the vertical PMIs are fed back in the same sub-frame, then there is also corresponding CQI information in the sub-frame in which the horizontal PMIs and the vertical PMIs are fed back, and if the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs;

wherein if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs.

2. The method of claim 1, wherein determining the PMIs to be fed back comprises:

selecting at least one horizontal PMI and at least one vertical PMI from different sets of codebooks or the same set of codebooks; or selecting at least one horizontal and vertical joint PMI from a joint set of codebooks.

3. The method of claim 2, wherein the number of dimensions of a pre-coding matrix in the set of codebooks from which at least one joint PMI is selected are (Nt*Ne)*R, wherein Nt represents the number of horizontal antenna ports, Ne represents the number of vertical antenna ports, and R represents the index of a rank.

4. The method of claim 1, wherein the method further comprises:

if the sub-frame in which the PMIs are fed back collides with a sub-frame in which RIs are fed back, then only RI information is fed back;

if the sub-frame in which the vertical PMIs are fed back collides with the sub-frame in which the horizontal PMIs are fed back, then only the horizontal PMIs are fed back; and if the sub-frame in which the horizontal PMIs and the vertical PMIs are fed back collides with the sub-frame in which information of the horizontal PMIs or the vertical PMIs are fed back, then only the horizontal PMIs and the vertical PMIs are fed back.

5. A method for receiving a Pre-coding Matrix Indicator, PMI, wherein the method comprises:

determining a feedback mode in which PMIs are fed back, wherein the feedback mode is a non-periodical Channel State Information, CSI, feedback mode or a periodical CSI feedback mode; and receiving the feedback PMIs in the determined feedback mode, wherein the PMIs comprise horizontal PMIs and vertical PMIs, or horizontal and vertical joint PMIs;

wherein in a case that the PMIs comprise horizontal PMIs and vertical PMIs; and in the periodical CSI feedback mode, the horizontal PMIs and the vertical PMIs are fed back only in the same sub-frame;

the horizontal PMIs and the vertical PMIs are fed back in the same sub-frame or different sub-frames; or the horizontal PMIs and the vertical PMIs are fed back only in different sub-frames;

wherein if the horizontal PMIs and the vertical PMIs are fed back only in the same sub-frame in the periodical CSI feedback mode, then the horizontal PMIs and the vertical PMIs are fed back in the same sub-frame together with corresponding Channel Quality Indicators, CQIs;

wherein the horizontal PMIs and the vertical PMIs are fed back in the same sub-frame or different sub-frames in the periodical CSI feedback mode; and if the horizontal PMIs and the vertical PMIs are fed back in the same sub-frame, then there is also corresponding CQI information in the sub-frame in which the horizontal PMIs and the vertical PMIs are fed back, and if the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs;

wherein if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs.

6. A device for feeding back a Pre-coding Matrix Indicator, PMI, wherein the device comprises:

a first determining module configured to determine PMIs to be fed back comprising horizontal PMIs and vertical PMIs, or horizontal and vertical joint PMIs; and a transmitting module configured to feed back the determined PMIs in a non-periodical Channel State Information, CSI, feedback mode or a periodical CSI feedback mode;

wherein in a case that the PMIs comprise horizontal PMIs and vertical PMIs; and in the periodical CSI feedback mode, the horizontal PMIs and the vertical PMIs are fed back only in the same sub-frame;

the horizontal PMIs and the vertical PMIs are fed back in the same sub-frame or different sub-frames; or the horizontal PMIs and the vertical PMIs are fed back only in different sub-frames;

wherein if the horizontal PMIs and the vertical PMIs are fed back only in the same sub-frame in the periodical CSI feedback mode, then the horizontal PMIs and the vertical PMIs are fed back in the same sub-frame together with corresponding Channel Quality Indicators, CQIs;

wherein the horizontal PMIs and the vertical PMIs are fed back in the same sub-frame or different sub-frames in the periodical CSI feedback mode; and if the horizontal PMIs and the vertical PMIs are fed back in the same sub-frame, then there is also corresponding CQI information in the sub-frame in which the horizontal PMIs and the vertical PMIs are fed back, and if the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs;

wherein if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs.

7. The device of claim 6, wherein the first determining module is configured:

to select at least one horizontal PMI and at least one vertical PMI from different sets of codebooks or the same set of codebooks; or to select at least one horizontal and vertical joint PMI from a joint set of codebooks.

8. A device for receiving a Pre-coding Matrix Indicator, PMI, wherein the device comprises:

a second determining module configured to determine a feedback mode in which PMIs are fed back, wherein the feedback mode is a non-periodical Channel State Information, CSI, feedback mode or a periodical CSI feedback mode; and a receiving module configured to receive the fed-back PMIs in the determined feedback mode, wherein the PMIs comprise horizontal PMIs and vertical PMIs, or horizontal and vertical joint PMIs;

wherein in a case that the PMIs comprise horizontal PMIs and vertical PMIs; and in the periodical CSI feedback mode, the horizontal PMIs and the vertical PMIs are fed back only in the same sub-frame;

the horizontal PMIs and the vertical PMIs are fed back in the same sub-frame or different sub-frames; or the horizontal PMIs and the vertical PMIs are fed back only in different sub-frames;

wherein if the horizontal PMIs and the vertical PMIs are fed back only in the same sub-frame in the periodical CSI feedback mode, then the horizontal PMIs and the vertical PMIs are fed back in the same sub-frame together with corresponding Channel Quality Indicators, CQIs;

wherein the horizontal PMIs and the vertical PMIs are fed back in the same sub-frame or different sub-frames in the periodical CSI feedback mode; and if the horizontal PMIs and the vertical PMIs are fed back in the same sub-frame, then there is also corresponding CQI information in the sub-frame in which the horizontal PMIs and the vertical PMIs are fed back, and if the horizontal PMIs and the vertical PMIs are fed back in different sub-frames, then there is also corresponding CQI information in the sub-frame in which the horizontal PMIs are fed back and/or corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs;

wherein if the horizontal PMIs and the vertical PMIs are fed back only in different sub-frames in the periodical CSI feedback mode, then there is also corresponding CQI information in the sub-frame in which the horizontal PMIs are fed back and/or there is also corresponding CQI information in the sub-frame in which the vertical PMIs are fed back, wherein CQIs corresponding to the horizontal PMIs are determined from the horizontal PMIs, or the horizontal PMIs and the vertical PMIs; and CQIs corresponding to the vertical PMIs are determined from the vertical PMIs, or the horizontal PMIs and the vertical PMIs.

* * * * *